United States Patent
Cheon et al.

(10) Patent No.: US 7,546,567 B2
(45) Date of Patent: Jun. 9, 2009

(54) METHOD AND APPARATUS FOR GENERATING A VARIATION-TOLERANT CLOCK-TREE FOR AN INTEGRATED CIRCUIT CHIP

(75) Inventors: Yongseok Cheon, Portland, OR (US); Pei-Hsin Ho, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 191 days.

(21) Appl. No.: 11/652,302

(22) Filed: Jan. 10, 2007

(65) Prior Publication Data

US 2008/0168412 A1 Jul. 10, 2008

(51) Int. Cl.
*G06F 17/50* (2006.01)
(52) U.S. Cl. .................. 716/6; 716/7; 716/10
(58) Field of Classification Search .......... None
See application file for complete search history.

(56) References Cited

U.S. PATENT DOCUMENTS

| | | | | |
|---|---|---|---|---|
| 5,557,779 | A * | 9/1996 | Minami ................ | 716/6 |
| 6,367,060 | B1 * | 4/2002 | Cheng et al. ........... | 716/10 |
| 6,698,006 | B1 * | 2/2004 | Srinivasan et al. ....... | 716/10 |
| 7,117,472 | B2 * | 10/2006 | Auracher et al. ........ | 716/13 |
| 7,257,782 | B2 * | 8/2007 | Ho et al. .............. | 716/2 |
| 2008/0216040 | A1 * | 9/2008 | Furnish et al. ......... | 716/10 |

OTHER PUBLICATIONS

Cheon et al., "Power-Aware Placement," Design Automation Conference 2005, pp. 795-800.*
Rajaram et al., "Reducing Clock Skew Variability via Cross Links," Design Automation Conference 2004, pp. 18-23.*
Velenis et al., "A Clock Tree Topology Extraction Algorithm for Improving the Tolerance of Clock Distribution Networks to Delay Uncertainty," 2001 IEEE, pp. 422-425.*

* cited by examiner

*Primary Examiner*—Leigh Marie Garbowski
(74) *Attorney, Agent, or Firm*—Park, Vaughan & Fleming LLP

(57) ABSTRACT

One embodiment of the present invention relates to a process that generates a clock-tree on an integrated circuit (IC) chip. During operation, the process starts by receiving a placement for a chip layout, where the placement includes a set of registers at fixed locations in the chip layout. The process then generates a timing criticality profile for the set of registers, wherein the timing criticality profile specifies timing criticalities between pairs of registers in the set of registers. Next, the process clusters the set of registers based on the timing criticality profile to create a clock-tree for the set of registers. By clustering the registers based on the timing criticality profile, the process facilitates using commonly-shared clock paths in the clock-tree to provide clock signals to timing critical register pairs.

25 Claims, 6 Drawing Sheets

METHOD AND APPARATUS FOR GENERATING A VARIATION-TOLERANT CLOCK-TREE FOR AN INTEGRATED CIRCUIT CHIP

BACKGROUND

1. Field of the Invention

The present invention relates to techniques for designing clock distribution networks for integrated circuit (IC) chips. More specifically, the present invention relates to a method and an apparatus for generating a clock-tree on an IC chip to facilitate reducing the effects of on-chip variation (OCV).

2. Related Art

Advances in semiconductor technology presently make it possible to integrate large-scale systems, including hundreds of millions of transistors, onto a single semiconductor chip. Integrating such large-scale systems onto a single semiconductor chip increases the speed at which such systems can operate, because signals between system components do not have to cross chip boundaries, and are not subject to lengthy chip-to-chip propagation delays.

The speed of a system on an integrated circuit (IC) chip is largely determined by system clock frequency. In a typical synchronous IC chip, a clock distribution network (referred to as a "clock-tree") is used to distribute a clock signal from a common source to various circuit components. This clock signal is used to coordinate data transfers between circuit components. However, as increasing clock frequencies reduce the clock periods to fractions of a nanosecond, designing clock-trees is becoming increasingly more challenging. A direct result of the decreasing clock period is a shrinking "timing budget" between logically coupled clock sinks. This decreasing timing budget is requiring clock-trees to have minimal clock skew.

Many sources contribute to clock skew in a clock-tree. Among these sources, "variations" have become one of the more significant challenges in synchronous clock-tree design. These variations can include: manufacturing process variations, operational voltage variations, and ambient temperature variations. In particular, some of these variations occur within a chip boundary, and are hence referred to as "on-chip variations" (OCV). Due to the impact of OCV, the timing characteristics of instances of the same component may vary across the chip, thereby limiting the performance of the chip, and even threatening the functionality of the chip. Furthermore, OCV causes uncertainty in clock arrival times at circuit components. This uncertainty can cause clock skew and can thereby worsen the timing performance of the data paths between the clock sinks.

In order to reduce the effects of OCV, some systems insert shunt connections called "cross links" into a clock-tree structure in a post-processing step (see A. Rajaram, J. Hu and R. Mahapatra, "Reducing Clock Skew Variability via Cross Links," *IEEE Trans. Computer-Aided Design*, Vol. 25, No. 6, pp. 1176-1182, June, 2006). These cross links can increase the amount of clock-path sharing between registers, thereby improving OCV-tolerance. However, this technique requires significantly more routing resources (wires) than would be needed by a typical clock-tree. Furthermore, the timing characteristics of the cross links are generally difficult to analyze. Another disadvantage of this technique is that additional wires also increase overall power consumption of the chip.

Other systems address the OCV issue by sequentially merging timing-critical pairs of registers based on a priority ordering (see D. Velenis, et al., "A clock tree topology extraction algorithm for improving the tolerance of clock distribution networks to delay uncertainty," *ISCAS* 2001). However, this technique does not use any physical proximity information to guide clock-tree synthesis, and therefore suffers from problems such as unbalanced tree topology, larger wire length overhead, and higher power consumption.

Hence, what is needed is a method and an apparatus for creating an OCV-tolerant clock-tree without the problems described above.

SUMMARY

One embodiment of the present invention relates to a process that generates a clock-tree on an integrated circuit (IC) chip. During operation, the process starts by receiving a placement for a chip layout, where the placement includes a set of registers at fixed locations in the chip layout. The process then generates a timing criticality profile for the set of registers, wherein the timing criticality profile specifies timing criticalities between pairs of registers in the set of registers. Next, the process clusters the set of registers based on the timing criticality profile to create a clock-tree for the set of registers. By clustering the registers based on the timing criticality profile, the process facilitates using commonly-shared clock paths in the clock-tree to provide clock signals to timing critical register pairs.

In a variation on this embodiment, the process obtains the timing criticality between a pair of registers by computing a timing slack between the pair of registers based on the received placement.

In a further variation on this embodiment, the process computes the timing slack between the pair of registers by computing a data path delay and a clock skew between the pair of registers based on the received placement.

In a variation on this embodiment, the process generates the timing criticality profile for the set of registers by constructing a graph G(V, E), wherein V is the set of registers and E is the set of edges between the set of registers weighted by the corresponding timing criticalities.

In a variation on this embodiment, the process clusters the set of registers based on the timing criticality profile to create a clock-tree by: clustering the set of registers at a leaf-level to generate a disjoint set of leaf-level clusters; assigning a clock buffer to each of the leaf-level clusters to generate a set of clock-buffers; and clustering the set of clock-buffers to generate a disjoint set of non-leaf level clusters.

In a further variation on this embodiment, the process clusters the set of registers at the leaf-level by: prioritizing the pairs of registers based on the associated timing criticalities, wherein a more timing critical pair of registers receives a higher priority; and attempting to assign a pair of registers to the same cluster based on the associated priority, thereby substantially maximizing the inclusion of the timing critical register pairs into the same clusters.

In a further variation, registers within the same cluster share clock-buffers and clock-nets along associated clock paths in the clock-tree.

In a further variation, prior to clustering the set of registers based on the timing criticality profile, the process clusters the set of registers using a geometric location-based clustering process to obtain a temporary partial-clock-tree, which comprises a disjoint set of clusters. The process then extracts a set of constraints from the set of clusters. Next, the process discards the temporary partial-clock-tree.

In a further variation, the set of constraints can include: a bounding box size for a cluster; a bounding box shape for a cluster; a fanout within a cluster; and a capacitance within a cluster.

In a further variation, the process clusters the set of registers based on the timing criticality profile by applying the set of constraints to each of the leaf-level clusters and the non-leaf-level clusters to ensure that the constraints are not violated.

In a variation on this embodiment, using commonly-shared clock paths in the clock-tree to provide clock signals to the timing critical register pairs improves timing performance of the IC chip by reducing the impact of on-chip-variations in creating clock skew between registers in timing critical register pairs.

In a further variation on this embodiment, the on-chip-variations can include: process variations; voltage variations; and temperature variations.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Integrated Circuit Design Flow

Figure 1:
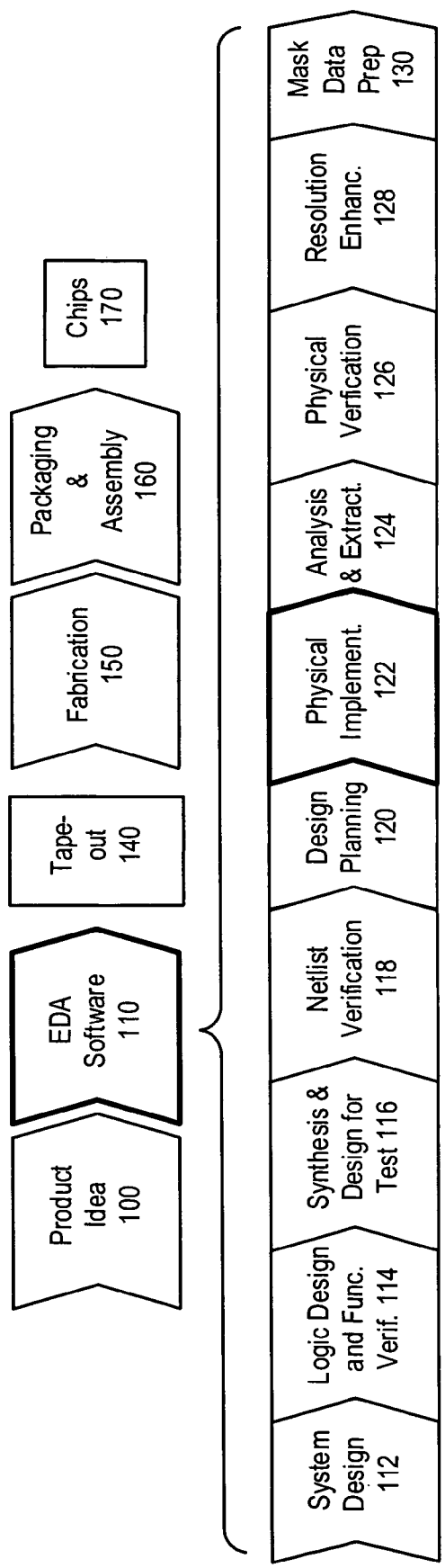
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process starts with the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): The designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): In this step, the design is checked to ensure correctness for manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Embodiments of the present invention can be used during one or more of the above described steps. Specifically, one embodiment of the present invention can be used during the physical implementation step 122.

Overview of the Clock-Three Generation Technique

The present invention provides a technique for improving overall timing performance of an IC chip in the presence of clock variations. Specifically, using a placed IC design as an input, the present invention performs a clock-tree synthesis (CTS) operation on the IC design to maximize commonly-shared clock paths (including clock buffers and clock nets) to the registers in the IC design if they have tighter timing constraints between them.

More specifically, the present invention first extracts timing information as a preprocessing step of the CTS, so that timing critical register pairs can be identified from the placed design netlist. Next, starting from leaf-level clustering, the present invention attempts to maximize the inclusion of the timing critical register pairs into the same cluster.

Furthermore, one embodiment of the present invention uses a two-pass clustering procedure to minimize the negative effects of a pure timing-based clustering on general CTS qualities (such as maximum global skew, clock wire length, power, and insertion delay). In the first pass, a location-based general purpose clustering is performed, and a disjoint set of clusters is obtained. The statistics on the capacitances and bounding boxes of the clusters are then extracted from the set of clusters as guiding constraints for the second pass. In the second pass, the clustering is re-done based on both the timing criticality profile and a set of constraints from the first pass, so that the set of constraints (e.g., maximum capacitance, maximum fanout, etc.) are not violated.

The two-pass CTS procedure is performed in a bottom-up manner, and can be extended to non-leaf levels. Note that each resulting cluster is driven by a single clock buffer (or inverter), both at the leaf-level and at non-leaf levels.

Variations Impact on Clock Skew and Timing Constraints

Note that on-chip variation (OCV) increases the clock skew uncertainties which subsequently worsen timing constraints in the circuits. Due to these variations, a certain clock path (to a launcher) can be slower than expected; while another clock path (to a capturer) can be faster than expected. A critical timing path clocked by such a clock-tree will potentially violate a specified timing constraint.

Figure 2:
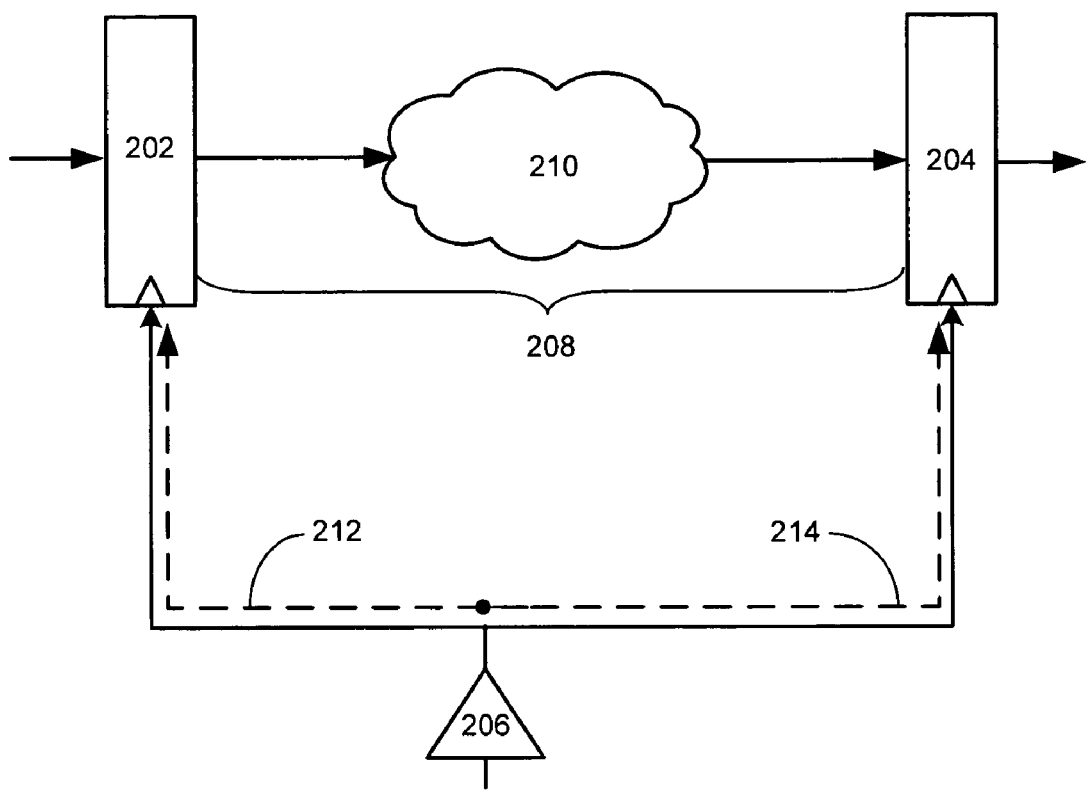
FIG. 2 illustrates the effect of OCV on an exemplary circuit in accordance with an embodiment of the present invention.

FIG. 2 illustrates the effect of OCV on an exemplary circuit in accordance with an embodiment of the present invention.

FIG. 2 includes two logically coupled registers 202 and 204, and a clock source 206. Register 202 is coupled to register 204 through a data path 208 which includes a combinational logic 210. Note that in this configuration, we refer to register 202 as a "launcher" and register 204 as a "capturer", respectively. A clock signal generated by clock source 206 is distributed to registers 202 and 204 through two different clock paths 212 and 214, which are associated with clock path delays $C_1$ and $C_2$, respectively. Ideally, $C_1$ and $C_2$ are designed to be identical. In reality, there almost always exists a difference between them, which is referred to as the clock skew $\Delta = C_1 - C_2$. Note that in FIG. 2, clock path (wire) 212 is shorter than clock path (wire) 214.

During a clock cycle, new data presented at the outputs of register 202 moves downstream through data path 208 and is latched onto the inputs of register 204. During normal circuit operation, the timing constraint stipulates that a delay d associated with data path 208 plus a setup time t associated with register 204 is less than the clock period T, i.e., $d+t<T$. Furthermore, due to the non-zero clock skew resulting from $C_1$ and $C_2$, the timing constraint becomes $C_1+d+t<T+C_2$, which can be rewritten in terms of the clock skew as: $\Delta+d+t<T$. The difference $(T-t)-(\Delta+d)$ is referred to as the "slack," and hence a negative slack results in a violation of the timing constraint.

Note that variations, such as processing variations (e.g., width of the clock wire), voltage variations, and temperature variations can result in uncertainties in clock path delays $C_1$ and $C_2$. Because these uncertainties can have both positive and negative values, a worst case scenario is typically considered. For example, the uncertainties can simultaneously cause an increase of $C_1$ and a decrease of $C_2$. Hence the clock skew $\Delta$ becomes significantly larger, and the above timing constraint becomes more stringent. Furthermore, if there is not a sufficient positive slack, this increase of clock skew can cause a violation of the timing constraint more easily which can lead to failures in the circuits.

Note that if there are more commonly-shared portions in the clock paths (including clock buffers and clock nets) from the clock source to different clock sinks, the data path between the pair of clock sinks becomes less vulnerable to the variations, because the commonly-shared clock path up to a common point does not contribute to clock skew uncertainties. In one embodiment of the present invention, the effect of shared clock paths can be measured by using a method called "clock reconvergence pessimism removal" or CRPR.

Figure 3:
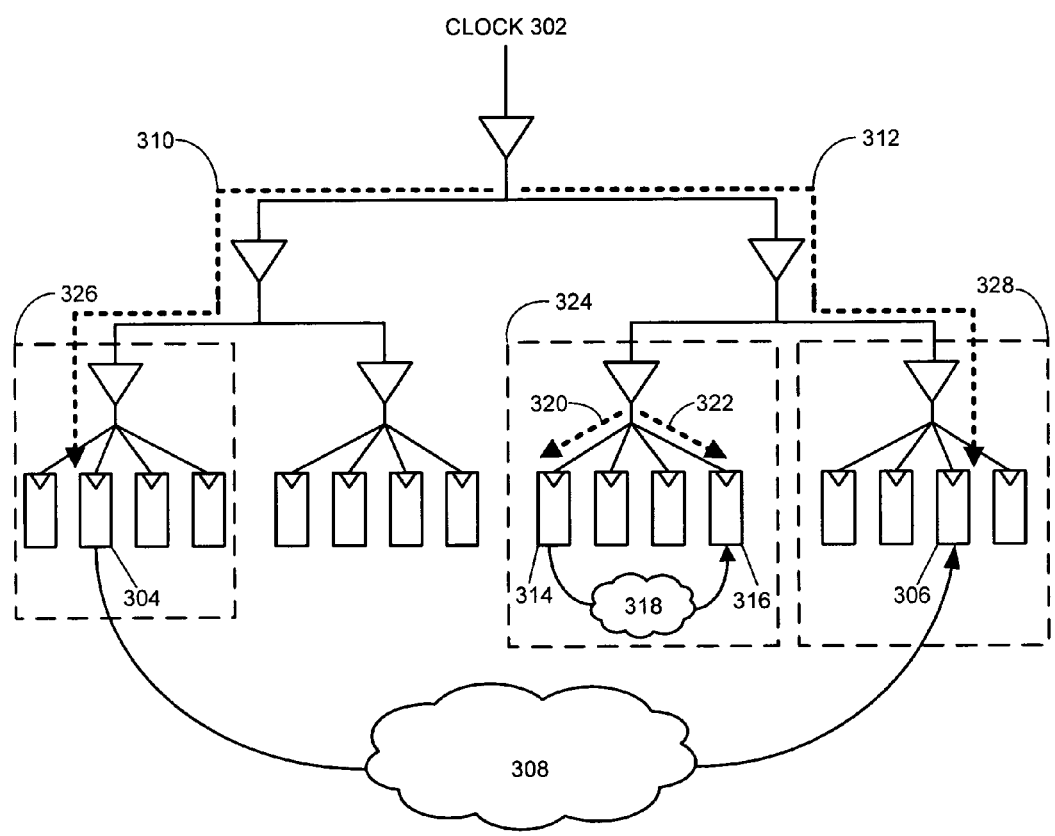
FIG. 3 illustrates an exemplary clock-tree structure with leaf-level registers in accordance with an embodiment of the present.

FIG. 3 illustrates an exemplary clock-tree structure 300 with leaf-level registers in accordance with an embodiment of the present.

Clock-tree structure 300 includes a main clock source 302 at the root of clock-tree 300, two middle levels of clock-buffers, and a leaf-level comprising a set of clustered registers. Registers 304 and 306 form a launcher/capturer pair which is logically coupled through a data path 308. When comparing the two clock paths from clock 302 to registers 304 and 306, note that branch 310 and branch 312 are the non-shared "private" sections of the two clock paths, respectively. These two private branches contain a total of four unshared clock buffers.

Registers 314 and 316 form another launcher/capturer pair which is logically coupled through a data path 318. Note that the clock paths for registers 314 and 316 are mostly shared, and the private sections of the two clock paths are branch 320 and branch 322, respectively. These two private branches are both local branches which contain no clock buffers. Note that register pair 314/316 achieves a significantly more clock-path sharing than the register pair 304/306.

In one embodiment of the present invention, the total number of unshared clock-buffers in both clock paths of a launcher/capturer pair is used to indicate a severity of the effects due to OCV. In this embodiment, OCV causes a much more severe impact on data path 308 than on data path 318. Note that generally registers within a same cluster, for example in cluster 324, are less vulnerable to OCV than register pairs in different clusters, for example, between cluster 326 and cluster 328. Based on above observation, we provide an OCV-aware CTS technique below.

Generating a OCV-Tolerant Clock-Tree

Figure 4:
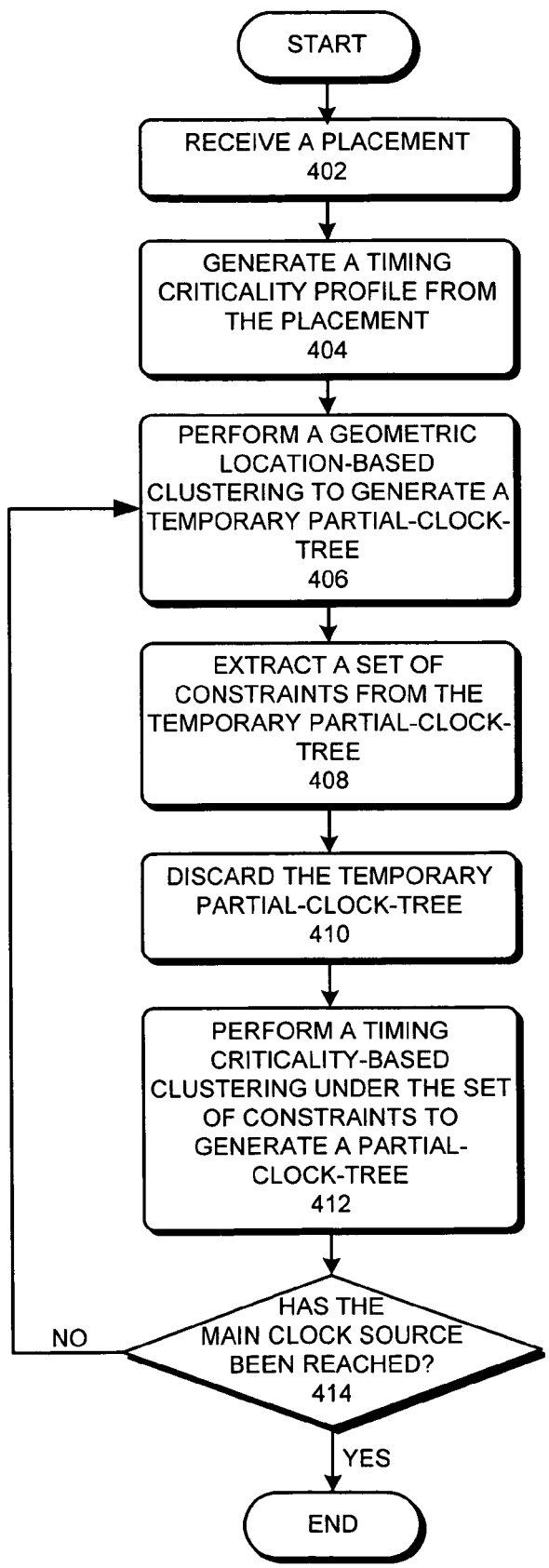
FIG. 4 presents a flowchart illustrating the process of generating a clock-tree to improve timing performance in accordance with an embodiment of the present.

FIG. 4 presents a flowchart illustrating the process of generating a clock-tree to improve timing performance in accordance with an embodiment of the present.

During operation, the process starts by receiving a placement of an IC chip design (step 402). Specifically, in this IC chip design all the registers and the corresponding combinational logics between registers have been placed at respective locations within the chip boundary, and the connectivities between registers are specified in a design netlist file.

The process then generates a timing criticality profile for the set of registers, wherein the timing criticality profile specifies timing criticalities between pairs of launcher/capturer in the set of registers (step 404). As a result, timing critical register pairs can be identified from the placed design netlist.

Note that a timing criticality can be computed based on the slack described above, i.e., (T−t)−(Δ+d), wherein T is the clock period, t is the setup time of the capturer, and d is the data path delay which can be obtained from the placed design netlist. However, because the clock-tree has not been established at this stage, an exact clock skew is unknown. In one embodiment, an ideal clock skew of zero is assumed. In a further embodiment, a clock skew of a predetermined value is assumed (for example, by making a worst case estimate of the clock skew).

One embodiment of the present invention represents the timing criticality profile as a graph G(V, E), wherein V represents the set of registers and E is the set of edges between the set of registers weighted by their corresponding timing criticalities. Specifically, an edge between each pair of launcher/capturer is assigned a weight (for example, from 0 to 10) based on its timing criticality. For example, in FIG. 3, the edge between register pair 304/306 will be assigned a higher weight than the edge between register pair 314/316 if the former has a longer data path delay. In order to reduce the complexity of the timing graph G, only those edges associated with sufficiently large weights will be included in the graph, and considered as timing critical. Consequently, registers with relatively low timing criticalities are not considered for their timing profile during clustering.

Note that the timing graph G can be overlaid on the placed chip layout using two-dimensional (2D) distance-coordinates, and the set of edges can be displayed as straight lines connecting timing critical register pairs (as the end points of an edge).

Performing a Location-Based CTS

A conventional location-based clustering technique aims to minimize the clock skew, power consumption, wire length, etc., by clustering leaf-level registers and upper-level clock-buffers based on the physical proximity of the components at each level in the placement configuration. For example, when two registers are placed far apart from each other, the technique tends to avoid clustering them together which would lead to larger clock skew. However, it is possible that these two physically distant registers are associated by a high timing criticality. This timing profile is not considered by the conventional location-based CTS. On the other hand, two physically nearby registers can be logically unrelated, and therefore are not required to be clustered together. However, this is also not considered by the conventional location-based CTS. In contract, the present invention takes into account both geometric and timing information while creating a clock-tree.

Referring back to FIG. 4, the process next performs a first-pass location-based clustering on the set of registers to generate a temporary partial-clock-tree, which comprises a disjoint set the clusters (step 406). Specifically, the clustering is based primarily on the physical proximity of the components, while also considering a set of user specified "hard" constraints. These user-specified constraints on a cluster can include but are not limited to: maximum/minimum capacitance within a cluster and maximum/minimum fanout within a cluster.

Note that the set of clusters in the temporary partial-clock-tree includes clusters from both the leaf-level and non-leaf-levels, and each cluster has an associated bounding box containing a set of nodes (registers or clock-buffers). Furthermore, each cluster is driven by a single common clock buffer.

Next, the process extracts statistics from the set of clusters (step 408). These statistics form a new set of constraints on a cluster, which can include but is not limited to: a maximum/minimum bounding box size of a cluster, a bounding box shape (e.g., a maximum aspect ratio) of a cluster, a maximum/minimum capacitance within a cluster, and maximum/minimum fanout within a cluster. In one embodiment, a statistics on the capacitance can be obtained by taking the average of the capacitances in the set of clusters. Note that the new constraint on the maximum capacitance can become "tighter" than the original user-specified constraint. However, the fanout constraint can generally be maintained as a constant throughout.

Note that the bounding box constraints may be different at different clock-tree levels. For example, the maximum bounding box size is typically smaller at the leaf-level than at a non-leaf level. A bounding box shape constraint can also be used to eliminate bounding boxes with undesirable shapes. For example, a bounding box with a high aspect ratio is undesirable because it can cause a large clock skew between a pair of registers, wherein one of the registers (along a short side of the bounding box) is closer to the associated common clock buffer while the other register (at the far end of a long side of the bounding box) is farther away from the common clock buffer.

When the constraints in the set of clusters have been extracted, the process restores the original placement by removing all the clusters and discarding the temporary partial-clock-tree (step 410).

Timing-Criticality-Based CTS with Location-Based Constraints

Next, the process performs a new clustering for the entire chip to create a partial-clock-tree based on both the timing criticality profile of the set of registers and the set of constraints from the location-based clustering (step 412). More specifically, after the process has clustered the set of registers to generate a set of clusters, each new cluster is then assigned a common clock-buffer.

Note that above steps 406-412 generate a partial-clock-tree at the leaf level to produce the set of common clock-buffers. The remaining clock-tree-generation process is then performed in a bottom-up manner. Specifically, the process iteratively repeats steps 406-412 at each non-leaf level (clock-buffer clustering) to produce a higher level of the clock-tree. When a new clock-tree level is generated, the process determines if the main clock source has been reached (step 414). If so, the full clock-tree has been generated and the clustering process is done. Otherwise, the process returns to step 406 to continue clustering. We will describe a non-leaf level clustering in more details below.

Figure 5:
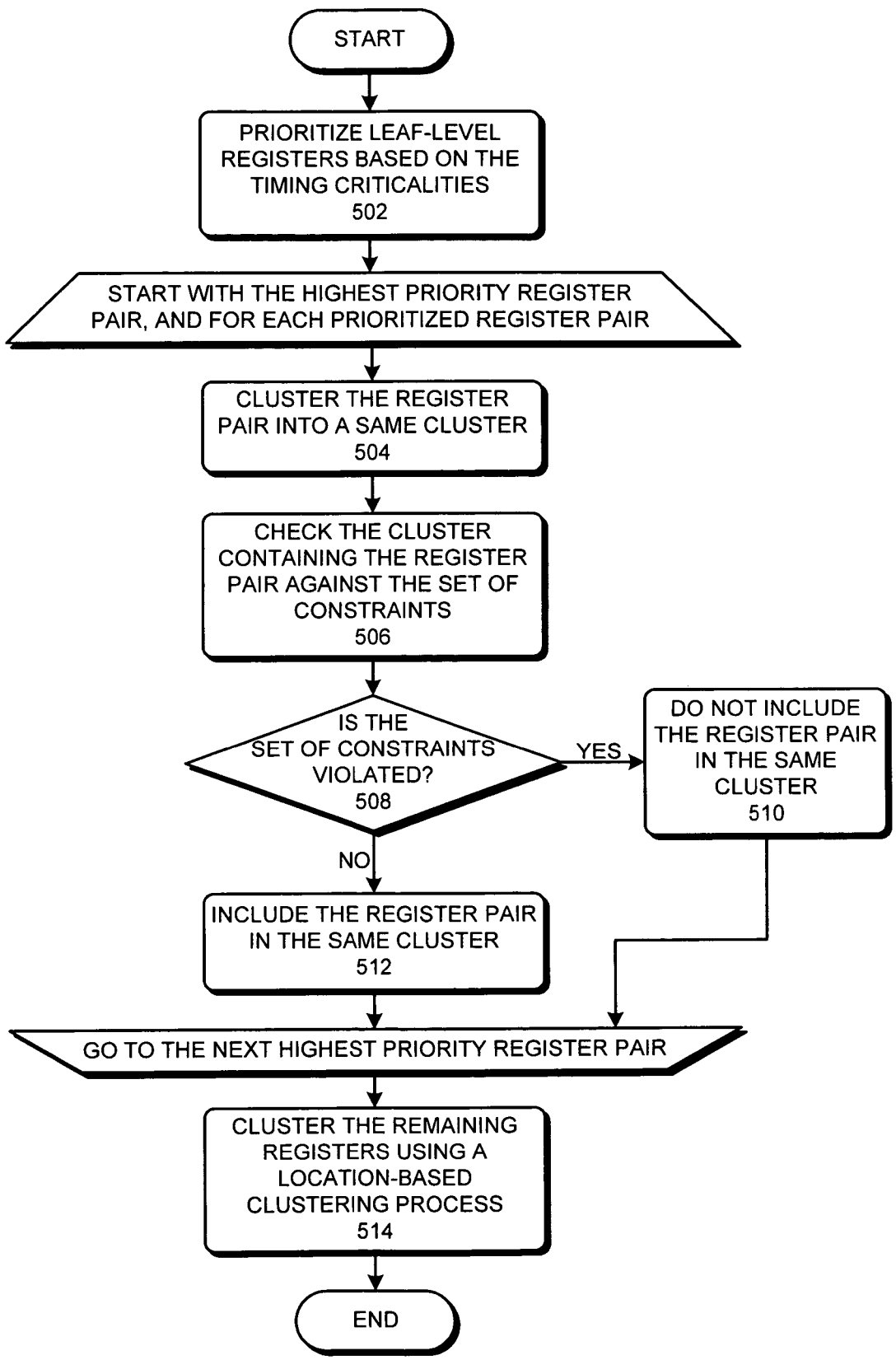
FIG. 5 presents a flowchart illustrating the process of clustering leaf-level registers based on both timing criticality profile and constraints from the location-based clustering in accordance with an embodiment of the present.

FIG. 5 presents a flowchart illustrating the process of clustering leaf-level registers based on both timing criticality profile and constraints from the location-based clustering in accordance with an embodiment of the present.

The process starts by prioritizing pairs of leaf-level registers based on their associated timing criticalities, wherein a more timing critical pair of registers receives a higher priority (step 502). One embodiment of this step is based on the timing graph G, wherein register pairs with higher weighted edges obtain higher priorities. In a further embodiment, only a subset of the registers in the chip placement are considered for their timing criticalities, and timing-critical pairs of registers are subsequently prioritized. We refer to these registers as "special" registers. In contrast, we refer to the remaining registers in the layout (non-timing critical ones) as "regular" registers.

Next, the process iteratively clusters the "special" registers based on their priorities (step 504). Specifically, the process uses a "greedy" approach which starts with the highest priority register pair (i.e., the one with the worst timing slack), and attempts to include them into the same cluster. The process then attempts to cluster the second highest priority pair into the same cluster, and so on. In general, the process attempts to assign the maximum possible number of critical pairs of registers to the same clusters.

During this iterative process, each prioritized register pair ($R_1$, $R_2$) can have different states as it is being processed. We look at each of these cases below:
1) Both $R_1$ and $R_2$ do not belong to any existing clusters:
    In this case, we simply create a new cluster to include ($R_1$, $R_2$);
2) $R_1$ belongs to cluster $C_1$, while $R_2$ does not belong to any existing clusters:
    In this case, we cluster $R_2$ into $C_1$. Note that there can be two sub-cases:
    (a) $R_2$ is already physically located within the bounding box of $C_1$. In this sub-case, we include $R_2$ into $C_1$ without modifying the bounding box of $C_1$; and
    (b) $R_2$ is physically located outside the bounding box of $C_1$. In this sub-case, we include $R_2$ into $C_1$ and additionally increase the bounding box size of $C_1$ to enclose $R_2$;
3) $R_1$ belongs to cluster $C_1$ while $R_2$ belongs to cluster $C_2$ ($C_1 \neq C_2$):
    In this case, cluster $C_1$ and cluster $C_2$ are merged into a new cluster $C_3$.
    Note that $C_3$ is typically associated with a larger bounding box than both $C_1$ and $C_2$; and finally
4) Both $R_1$ and $R_2$ belong to a same cluster C:
    In this case, we do not need to make any changes to cluster C. This case can be the result of register associations, for example, if both register pairs ($R_1$, $R_3$) and ($R_2$, $R_3$) have been previously clustered into the cluster C.

Note that in above cases, clustering register pair ($R_1$, $R_2$) can result in either a new cluster being created or an existing cluster being modified (for example, by adding new member registers). Consequently, after a pair of special registers has been included in the same cluster, the iterative process checks that cluster against the set of constraints (from the first pass clustering) (step 506) and determines if any of the constraints is violated (step 508). If so, the process does not include the registers in the same cluster (step 510). Note that this may also result in a newly created cluster being removed or a change to an existing cluster to be reversed. Otherwise, if the set of constraints are not violated, the process includes the register pair in the same cluster (step 512).

When all the special registers have been processed and clustered into "special clusters" (except of those that have failed the tests on constraints), the process clusters the remaining registers using a geometric location-based clustering process (step 514). Note that the remaining registers can include all the "regular" registers and the unclustered special registers.

In one embodiment of the present invention, step 512 is preceded by filling in the special registers with regular registers, so that each special cluster achieves a maximum allowed fanout. Note that this additional step facilitates reducing the total number of leaf-level clusters, which reduces the number of clock-buffers.

Clustering at Non-leaf Levels

Figure 6A:
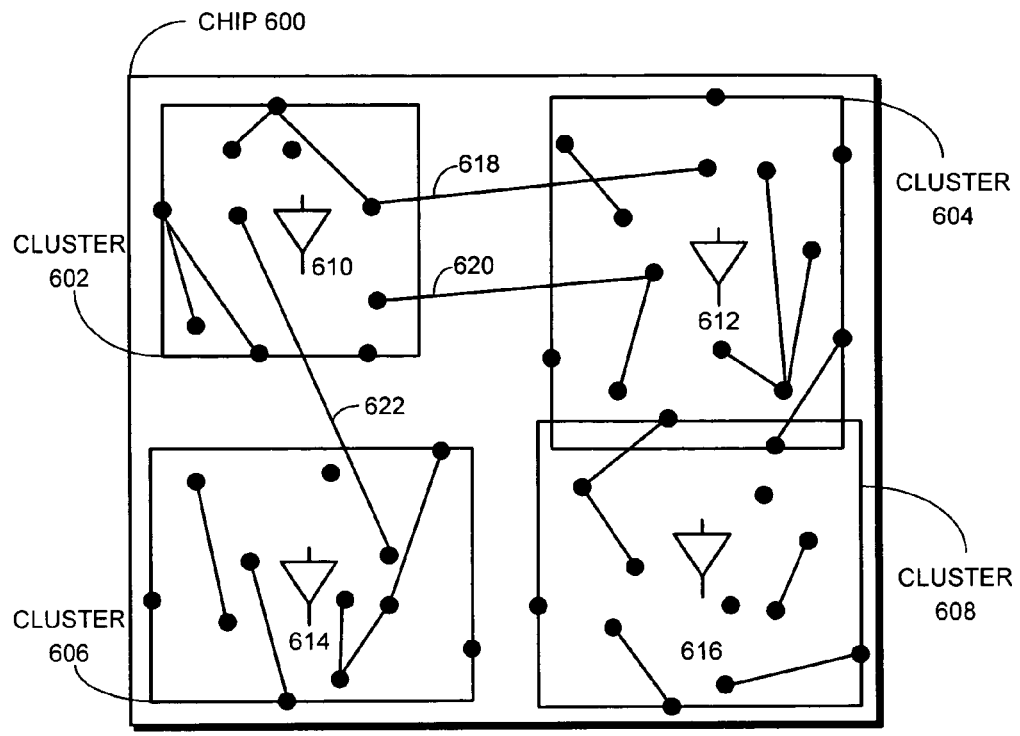
FIG. 6A illustrates an exemplary leaf-level-clustering result in accordance with an embodiment of the present.

FIG. 6A illustrates an exemplary leaf-level-clustering in accordance with an embodiment of the present.

In FIG. 6A, note that chip 600 has been grouped into four leaf-level clusters 602, 604, 606, and 608. Each cluster contains a set of registers (shown as filled circles), which further include both special registers (connected with edges) and regular registers (not connected with edges). To construct the leaf-level clock-tree, common clock-buffers 610, 612, 614, and 616 are added to drive the registers in clusters 602-608, respectively. Each clock-buffer then represents the corresponding cluster in the next clock-tree-level. Hence the first non-leaf level contains four clock-buffers. Note that adjacent clusters can have overlapping cluster boundaries as is illustrated between clusters 604 and 608.

Note that there are three unclustered timing critical register pairs within chip 600, which are represented by edges going across cluster boundaries. Specifically, edge 618 (with a weight 4) and edge 620 (with a weight 3) link registers in both clusters 602 and 604, while edge 622 (with a weight 5) connects registers in clusters 602 and 606. However, cluster 608 does not include such a register and edge.

Figure 6B:
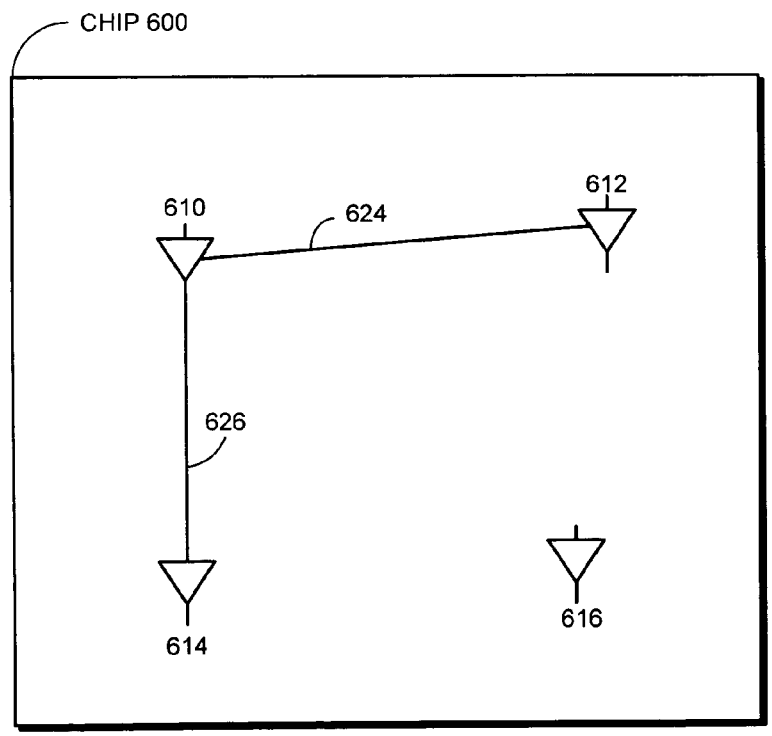
FIG. 6B illustrates the non-leaf-level abstraction of the clock buffers in FIG. 6A in accordance with an embodiment of the present.

FIG. 6B illustrates the non-leaf-level abstraction of the clock buffers in FIG. 6A in accordance with an embodiment of the present. Note that the edges in FIG. 6A have been "projected" into the next clock-tree-level. Specifically, we combine the weights of all the edges between two given clusters to create a single "aggregated" edge between the corresponding clock-buffers in the next level. For example, edge 624 obtains an aggregated weight of 7 (i.e., 4+3) while edge 626 receives an aggregated weight of 5.

Up to this point, a new timing graph G has been created for the first non-leaf-level, which includes a set of clock-buffers and a set of weighted edges between the set of clock-buffers, wherein the set of weighted edges identify the timing criticality between clock buffers. Analogously, clock buffers 610, 612, and 614 become the "special" clock-buffers, while clock-buffer 616 becomes a "regular" buffer.

Next, the CTS process proceeds in the same manner as in the leaf-level by repeating the procedure in FIG. 5. Note that repeating the clustering procedure for the non-leaf levels allows those special registers that failed to be clustered together at leaf-level to be clustered together at non-leaf-level with higher priorities.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a clock-tree on an integrated circuit (IC) chip, comprising:
    receiving a placement for a chip layout, where the placement includes a set of registers at fixed locations in the chip layout;
    generating, using a computer, a timing criticality profile for the set of registers, wherein the timing criticality profile specifies timing criticalities between pairs of registers in the set of registers; and
    clustering the set of registers based on the timing criticality profile to create a clock-tree for the set of registers, wherein clustering the set of registers involves clustering a first pair of registers which has a higher timing criticality between each other prior to clustering a second pair of registers which has a lower timing criticality between each other;

wherein clustering registers based on the timing criticality profile facilitates using commonly-shared clock paths in the clock-tree to provide clock signals to timing critical register pairs.

2. The method of claim 1, wherein obtaining the timing criticality between a pair of registers in the set of registers involves computing a timing slack between the pair of registers based on the received placement.

3. The method of claim 2, wherein computing the timing slack between the pair of registers involves computing a data path delay and a clock skew between the pair of registers based on the received placement.

4. The method of claim 1, wherein generating the timing criticality profile for the set of registers involves constructing a graph G(V, E), wherein V is the set of registers and E is the set of edges between the set of registers weighted by the corresponding timing criticalities.

5. The method of claim 1, wherein clustering the set of registers based on the timing criticality profile to create a clock-tree for the set of registers involves:
- clustering the set of registers at a leaf-level to generate a disjoint set of leaf-level clusters;
- assigning a clock buffer to each of the leaf-level clusters to generate a set of clock-buffers; and
- clustering the set of clock-buffers to generate a disjoint set of non-leaf level clusters.

6. The method of claim 5, wherein clustering the set of registers at the leaf-level involves:
- prioritizing the pairs of registers based on the associated timing criticalities, wherein a more timing critical pair of registers receives a higher priority; and
- attempting to assign a pair of registers to the same cluster based on the associated priority, thereby substantially maximizing the inclusion of the timing critical register pairs into the same clusters.

7. The method of claim 6, wherein the registers within the same cluster share clock-buffers and clock-nets along associated clock paths in the clock-tree.

8. The method of claim 6, wherein prior to clustering the set of registers based on the timing criticality profile, the method further comprises:
- clustering the set of registers using a geometric location-based clustering process to obtain a temporary partial-clock-tree, which comprises a disjoint set of clusters;
- extracting a set of constraints from the set of clusters; and
- discarding the temporary partial-clock-tree.

9. The method of claim 8, wherein the set of constraints can include:
- a bounding box size for a cluster;
- a bounding box shape for a cluster;
- a fanout within a cluster; and
- a capacitance within a cluster.

10. The method of claim 8, wherein clustering the set of registers based on the timing criticality profile further involves applying the set of constraints to each of the leaf-level clusters and the non-leaf-level clusters to ensure that the constraints are not violated.

11. The method of claim 1, wherein using commonly-shared clock paths in the clock-tree to provide clock signals to the timing critical register pairs improves timing performance of the IC chip by reducing the impact of on-chip-variations in creating clock skew between registers in timing critical register pairs.

12. The method of claim 11, wherein the on-chip-variations can include:
- process variations;
- voltage variations; and
- temperature variations.

13. A computer-readable storage medium storing instructions that when executed by a computer cause the computer to perform a method for generating a clock-tree on an integrated circuit (IC) chip, the method comprising:
- receiving a placement for a chip layout, where the placement includes a set of registers at fixed locations in the chip layout;
- generating a timing criticality profile for the set of registers, wherein the timing criticality profile specifies timing criticalities between pairs of registers in the set of registers; and
- clustering the set of registers based on the timing criticality profile to create a clock-tree for the set of registers, wherein clustering the set of registers involves clustering a first pair of registers which has a higher timing criticality between each other prior to clustering a second pair of registers which has a lower timing criticality between each other;
- wherein clustering registers based on the timing criticality profile facilitates using commonly-shared clock paths in the clock-tree to provide clock signals to timing critical register pairs.

14. The computer-readable storage medium of claim 13, wherein obtaining the timing criticality between a pair of registers in the set of registers involves computing a timing slack between the pair of registers based on the received placement.

15. The computer-readable storage medium of claim 14, wherein computing the timing slack between the pair of registers involves computing a data path delay and a clock skew between the pair of registers based on the received placement.

16. The computer-readable storage medium of claim 13, wherein generating the timing criticality profile for the set of registers involves constructing a graph G(V, E), wherein V is the set of registers and E is the set of edges between the set of registers weighted by the corresponding timing criticalities.

17. The computer-readable storage medium of claim 13, wherein clustering the set of registers based on the timing criticality profile to create a clock-tree for the set of registers involves:
- clustering the set of registers at a leaf-level to generate a disjoint set of leaf-level clusters;
- assigning a clock buffer to each of the leaf-level clusters to generate a set of clock-buffers; and
- clustering the set of clock-buffers to generate a disjoint set of non-leaf level clusters.

18. The computer-readable storage medium of claim 17, wherein clustering the set of registers at the leaf-level involves:
- prioritizing the pairs of registers based on the associated timing criticalities, wherein a more timing critical pair of registers receives a higher priority; and
- attempting to assign a pair of registers to the same cluster based on the associated priority, thereby substantially maximizing the inclusion of the timing critical register pairs into the same clusters.

19. The computer-readable storage medium of claim 18, wherein the registers within the same cluster share clock-buffers and clock-nets along associated clock paths in the clock-tree.

20. The computer-readable storage medium of claim 18, wherein prior to clustering the set of registers based on the timing criticality profile, the method further comprises:
- clustering the set of registers using a geometric location-based clustering process to obtain a temporary partial-clock-tree, which comprises a disjoint set of clusters;
- extracting a set of constraints from the set of clusters; and
- discarding the temporary partial-clock-tree.

21. The computer-readable storage medium of claim 20, wherein the set of constraints can include:
- a bounding box size for a cluster;
- a bounding box shape for a cluster;
- a fanout within a cluster; and
- a capacitance within a cluster.

22. The computer-readable storage medium of claim 20, wherein clustering the set of registers based on the timing criticality profile further involves applying the set of constraints to each of the leaf-level clusters and the non-leaf-level clusters to ensure that the constraints are not violated.

23. The computer-readable storage medium of claim 13, wherein using commonly-shared clock paths in the clock-tree to provide clock signals to the timing critical register pairs improves timing performance of the IC chip by reducing the impact of on-chip-variations in creating clock skew between registers in timing critical register pairs.

24. The computer-readable storage medium of claim 23, wherein the on-chip-variations can include:
- process variations;
- voltage variations; and
- temperature variations.

25. A computer system that generates a clock-tree on an integrated circuit (IC) chip, comprising:
- a processor;
- a memory;
- a receiving mechanism configured to receive a placement for a chip layout, where the placement includes a set of registers in fixed locations in the chip layout;
- a generating mechanism configured to generate a timing criticality profile for the set of registers, wherein the timing criticality profile specifies timing criticalities between pairs of registers in the set of registers; and
- a clustering mechanism configured to cluster the set of registers based on the timing criticality profile to create a clock-tree for the set of registers, wherein clustering the set of registers involves clustering a first pair of registers which has a higher timing criticality between each other prior to clustering a second pair of registers which has a lower timing criticality between each other;
- wherein clustering registers based on the timing criticality profile facilitates using commonly-shared clock paths in the clock-tree to provide clock signals to timing critical register pairs.

* * * * *